United States Patent [19]

Nagano

[11] Patent Number: 5,115,692
[45] Date of Patent: May 26, 1992

[54] BICYCLE PEDAL

[75] Inventor: Masashi Nagano, Izumi, Japan

[73] Assignee: Shimano Inc., Osaka, Japan

[21] Appl. No.: 754,210

[22] Filed: Aug. 27, 1991

Related U.S. Application Data

[63] Continuation of Ser. No. 430,376, Nov. 2, 1989, abandoned.

[30] Foreign Application Priority Data

Nov. 9, 1988 [JP] Japan ................. 63-283232

[51] Int. Cl.$^5$ .............................. G05G 1/14
[52] U.S. Cl. ....................... 74/594.4; 74/594.6; 74/560; 280/11.31
[58] Field of Search ............. 74/594.4, 594.6, 560; 280/11.3, 11.31, 617

[56] References Cited

U.S. PATENT DOCUMENTS

| | | | |
|---|---|---|---|
| 605,536 | 6/1898 | Brice | 74/594.6 |
| 3,811,339 | 5/1974 | Konzorr | 74/594.4 |
| 4,264,132 | 4/1981 | Konzorr | 74/594.4 |
| 4,298,210 | 11/1981 | Lotteau et al. | 74/594.4 |
| 4,686,867 | 8/1987 | Bernard et al. | 74/596.4 |
| 4,762,019 | 8/1988 | Beyl | 74/594.4 |
| 4,819,504 | 4/1989 | Sampson | 74/594.4 |
| 4,873,890 | 10/1989 | Nagano | 74/560 |
| 4,928,549 | 5/1990 | Nagano | 280/11.3 |

FOREIGN PATENT DOCUMENTS

| | | |
|---|---|---|
| 0146454 | 6/1985 | European Pat. Off. . |
| 0372165 | 6/1990 | European Pat. Off. . |
| 2362679 | 6/1975 | Fed. Rep. of Germany ..... 74/594.4 |
| 3426103 | 1/1986 | Fed. Rep. of Germany . |
| 3724578 | 1/1988 | Fed. Rep. of Germany . |
| 2541094 | 8/1984 | France . |
| 2612869 | 9/1988 | France . |

Primary Examiner—Leslie A. Braun
Assistant Examiner—Winnie Yip
Attorney, Agent, or Firm—Dickstein, Shapiro & Morin

[57] ABSTRACT

A bicycle pedal comprising a pedal body rotatably supported by a pedal shaft, and clamp assemblies mounted on the pedal body and arranged forwardly and rearwardly of a rotational axis of the pedal body for clamping a cleat of a shoe. Each of the clamp assemblies is movable between a clamping position and releasing position. Springs are provided for urging the clamp assemblies toward the respective clamping positions.

5 Claims, 6 Drawing Sheets

BICYCLE PEDAL

This application is a continuation of application Ser. No. 430,376, filed Nov. 2, 1989 now has been abandoned on Aug. 27, 1991.

BACKGROUND OF THE INVENTION

1. Field of the Invention

The present invention relates to a bicycle pedal, and particularly a bicycle pedal to which a cleat of a shoe is attachable.

2. Description of the Prior Art

As disclosed, for example, in Japanese Patent Publication U.S. Pat. No. 4,686,867, a pedal to which a shoe having a cleat is attachable, generally, comprises a pedal body rotatably supported on a pedal shaft and including a fixed clamp member at a forward position thereof and a movable clamp member at a rear position. When the shoe is placed on the pedal, the forward end of the cleat is engaged with the fixed clamp member. In this state, the shoe is depressed whereby the movable clamp member is caused to make a pivotal movement for engaging the rear end of the cleat.

This pedal allows the cleat to be fixable to one position only, which makes it difficult for the cleat to be placed in engagement with the clamp members in one fixing attempt. When the fixing attempt fails, the shoe is removed from the pedal thereby causing rotation of the pedal body. It is time-consuming to engage the cleat all over again after placing the pedal body in an appropriate posture, which constitutes an obstruction to bicycle running.

A portion adjacent the condyle of the metatarsals may be placed in contact with the pedal body for transmitting a depressing force to the pedal body. This facilitates an up and down motion of the metatarsals about the ankle joint with an arch formed between the ankle joint and the phalanges joints connected to the metatarsals, thereby promoting operability at times of pedaling. Therefore, in the prior art, the portion adjacent the condyle of the matatarsals is placed in contact with the pedal body when the shoes having the cleat is attached to the pedal.

However, when the portion adjacent the condyle of the matatarsals is placed in contact with the pedal body, the heal is remote from the pedal body to reduce the depressing force transmitted to the pedal body. As a result, the rider tends to become tired from heavy pedaling loads occurring when starting the bicycle or running uphill.

SUMMARY OF THE INVENTION

Having regard to the disadvantages of the prior art, an object of the present invention is to provide a bicycle pedal which offers increased opportunities for cleat engagement, and allows the cleat engaging position to be varied according to the pedaling loads.

Another object of the invention is to provide a bicycle pedal which allows a cleat to be engaged with ease even when the cleat attached is displaced axially of the pedal.

The above objects are achieved, according to the present invention, by a bicycle pedal comprising a pedal body rotatably supported by a pedal shaft, and clamp means mounted on the pedal body and defining engaging portions for engaging a cleat of a shoe, wherein the clamp means includes two clamp assemblies spaced from each other in a fore and aft direction, and each movable between a clamping position and releasing position, and urging means for urging the clamp assemblies toward the respective clamping positions.

The two clamp assemblies may be provided on each of opposite faces of the pedal body.

In a preferred embodiment of the invention the clamp assemblies define cleat engaging surfaces extending substantially parallel to an axis of the pedal body, whereby the cleat in an engaged position is movable rightward and leftward.

Each of the clamp assemblies may include a clamp member fixed to the pedal body.

With the bicycle pedal of the present invention, the shoe may be attached to the pedal by engaging the cleat with either the forward clamp assembly or the rearward clamp assembly provided on the pedal body, thereby providing increased opportunities for cleat engagement.

When the cleat is engaged with the rearward clamp assembly, the distance from the heel to the pedal body is increased for improving operability at times of pedaling. When the cleat is engaged with the forward clamp assembly, an increased depressing force may be transmitted to the pedal body since, at this time, the distance from the heel to the pedal body is shorter.

Increased cleat engaging opportunities may be provided also by the bicycle pedal of the present invention where the two clamp assemblies are provided on each opposite faces of the pedal body, or where the clamp assemblies define cleat engaging surfaces extending substantially parallel to an axis of the pedal body.

Where each of the clamp assemblies includes a clamp member fixed to the pedal body according to one embodiment of the invention, a movable clamp member of each clamp assembly is movable in a two-fold amount to enable a reliable engagement.

Other features and advantages of the present invention will be apparent from the following description.

DESCRIPTION OF THE PREFERRED EMBODIMENTS

In the drawings, a pedal shaft 1 is attached to the free end of a crank arm of a bicycle crank. A pedal body 2 is rotatably supported by the pedal shaft 1. The pedal body 2 comprises a hollow support 21 supported by the pedal shaft 1 through bearings not shown, a pair of front arms 22 extending forwardly from longitudinally opposite ends of the support 21, a pair of rear arms 23 extending rearwardly therefrom, a front tread 24 extending between the front arms 22, and a rear tread 25 extending between the rear arms 23.

A cleat 3 is attached to the bottom of a shoe not shown. The cleat 3 comprises a disk-like attachment portion 31 for attachment to the shoe, a front leg 32 extending downwardly from a front end of the attachment portion 31, and a rear leg 33 extending downwardly from a rear end thereof. Each of the legs 32 and 33 defines, at a free end thereof, an engaging surface 32a or 33a extending perpendicular to the longitudinal direction of the leg, and a guide surface 32b or 33b inclined in a tapered way from a projecting end of the engaging surface 32a or 33a toward the free end of the leg. Each engaging surface 32a or 33a has an arcuate peripheral edge, and each leg 32 or 33 also has an arcuate outer peripheral wall. Further, each engaging surface 32a or 33a defines an inclined surface at one lateral side thereof, which is inclined toward the center of the engaging surface.

In the embodiment shown in FIGS. 1 through 8, the pedal body 2 further comprises a first forward clamp member 4A and a first rearward clamp member 5A both disposed forwardly of the rotational axis L of the pedal body 2 and spaced from each other in the fore and aft direction. The first clamp members 4A and 5A are movable between a clamping position and a releasing position. Each of the clamp members 4A and 5A includes an engaging portion 41a or 51a for engaging the front leg 32 of the cleat 3. The clamp members 4A and 5A are urged toward the clamping position by first springs 6. On the other hand, a second forward clamp member 4B and a second rearward clamp member 5B are disposed rearwardly of the rotational axis L of the pedal body 2 and spaced from each other in the fore and aft direction. The second clamp members 4B and 5B are movable between a clamping position and a releasing position. Each of the clamp members 4B and 5B includes an engaging portion 41b or 51b for engaging the rear leg 33 of the cleat 3. The clamp members 4B and 5B are urged toward the clamping position by second springs 7. In this way, the first and second forward clamp members 4A and 4B constitute a forward clamp assembly 4, and the first and second rearward clamp members 5A and 5B a rearward clamp assembly 5.

The first forward clamp member 4A has a elongate shape extending axially of the pedal shaft 1. The clamp member 4A defines a guide portion 42a extending substantially over the entire length thereof and inclined downwardly from a forward end to a rear end thereof. Further, the clamp member 4A defines the engaging portion 41a disposed on the reverse side of the guide portion 42a, which extends forwardly from the rear end and substantially over the entire length thereof. The clamp member 4A includes a pair of mounting elements 43a disposed at longitudinally opposite ends thereof, respectively, and bent 90 degrees to be opposed to each other. These mounting elements 43a are pivotally connected to the front arms 22 through pivot shafts 8, respectively. The first springs 6 are mounted between positions on the forward face adjacent the opposite ends thereof and the front tread 24. Adjusting screws 12 are meshed in the front tread 24 for adjusting the forces of springs 6.

The first rearward clamp member 5A has an elongate shape extending axially of the pedal shaft 1 and defining an arcuate guide portion 52a on its surface. Further, the clamp member 5A defines the engaging portion 51a disposed on the reverse side of the guide portion 52a, which extends forwardly from the rear end and substantially over the entire length thereof. The clamp member 5A includes a pair of mounting elements 53a disposed at longitudinally opposite ends thereof, respectively, and bent 90 degrees downwardly to be opposed to each other. These mounting elements 53a are pivotally connected to the front arms 22 through pivot shafts 9, respectively. The clamp member 5A further includes stoppers 54 at the longitudinally opposite ends thereof. These stoppers 54 extend forwardly with forward ends thereof abutting on the rear face of the first forward clamp member 4A to stop the latter at the clamping position. The mounting elements 53a define contact portions 55 for contacting a pair of abutments 26 projecting forwardly from opposite ends of the support 21 of the pedal body 2, to stop the first rearward clamp member 5A at the clamping position.

The second forward clamp member 4B, like the first rearward clamp member 5A, has an elongate shape extending axially of the pedal shaft 1 and defining an arcuate guide portion 42b on its surface. Further, the clamp member 4B defines the engaging portion 41b disposed on the reverse side of the guide portion 42b, which extends forwardly from the rear end and substantially over the entire length thereof. The clamp member 4B includes a pair of mounting elements 43b disposed at longitudinally opposite ends thereof, respectively, and bent 90 degress to be opposed to each other. These mounting elements 43b are pivotally connected to the rear arms 23 through pivot shafts 10, respectively. The clamp member 4B further includes stoppers 44 at the longitudinally opposite ends thereof. These stoppers 44 extend rearwardly with rear ends thereof abutting on the front face of the second rearward clamp member 5B to stop the latter at the clamping position. The mounting elements 43b define contact portions 45 for contacting a pair of abutments 27 projecting rearwardly from the opposite ends of the support 21 of the pedal body 2, to stop the second rearward clamp member 5B at the clamping position.

The second rearward clamp member 5B, like the first forward clamp member 4A, has an elongate shape extending axially of the pedal shaft 1. The clamp member 5B defines a guide portion 52b extending substantially over the entire length thereof and inclined downwardly from a rear end to a forward end thereof. Further, the clamp member 5B defines the engaging portion 51b disposed on the reverse side of the guide portion 52b, which extends rearwardly from the forward end and substantially over the entire length thereof. The clamp member 5B includes a pair of mounting elements 53b disposed at longitudinally opposite ends thereof, respectively, and bent 90 degrees to be opposed to each other. These mounting elements 53b are pivotally connected to the rear arms 23 through pivot shafts 11, respectively. The second springs 7 are mounted between positions on the rear face adjacent the opposite ends thereof and the rear tread 25. Adjusting screws 13 are meshed in the rear tread 25 for adjusting the forces of springs 7.

The support 21 of the pedal body 2 defines guide surfaces 28 and 29 extending over the entire length thereof. The guide surface 28 is inclined forwardly downwardly toward the first rearward clamp member 5A, and the guide surface 29 rearwardly downwardly toward the second forward clamp member 4B. These guide surfaces 28 and 29 serve to guide the legs 32 and 33 of the cleat 3 toward the two clamp members 4B and 5A, respectively.

In the embodiment shown in FIGS. 1 through 8, the pedal body 2 comprises not only the clamp members 4A, 4B, 5A and 5B on one face thereof, but first and second forward clamp members 40A and 40B and first and second rearward clamp members 50A and 50B on the other face, i.e. the reverse side, thereof also. The clamp members 40A, 40B, 50A and 50B on the other face have substantially the same constructions as the clamp members 4A, 4B, 5A and 5B, and are movable relative to the pedal body 2 between clamping and releasing positions, with the first and second springs 6 and 7 urging them to the clamping positions. Thus, either the front face or reverse face of the pedal body 2 may be selected for securing the shoe. As noted above, these clamp members 40A, 40B, 50A and 50B are similar in construction to the clamp members 4A, 4B, 5A and 5B, which are attached to the pedal body 2 by the same means and are maintained in the clamping positions by the same means. Therefore, reference numerals indicating details of the clamp members 40A, 40B, 50A and 50B are omitted from the drawings.

When attaching the cleat 3 of a shoe to the pedal having the construction as described above, the cleat is engageable by the first and second forward clamp members 4A and 4B or the first and second rearward clamp members 5A and 5B.

Figure 6:
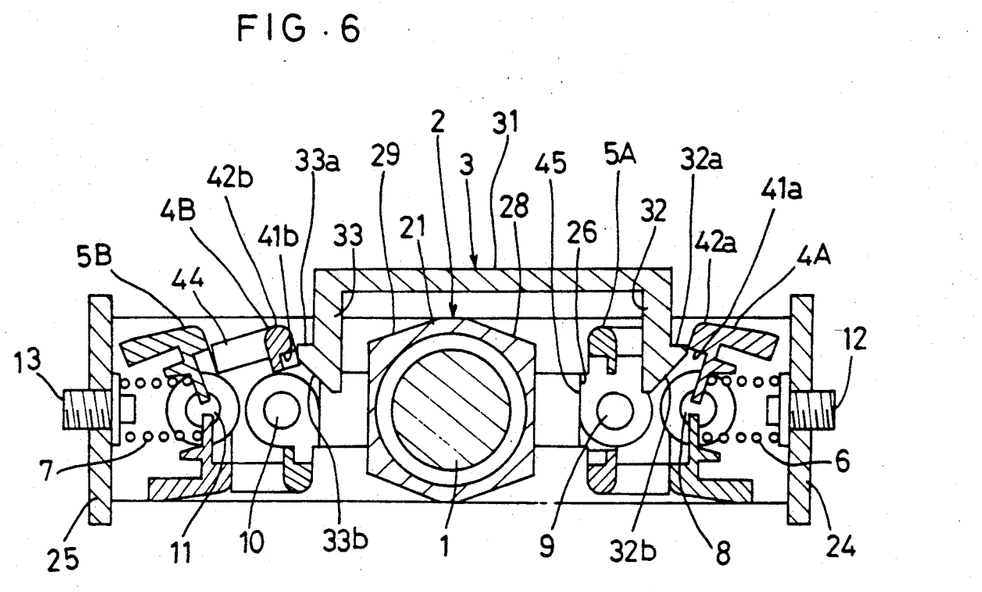
Figure 7:
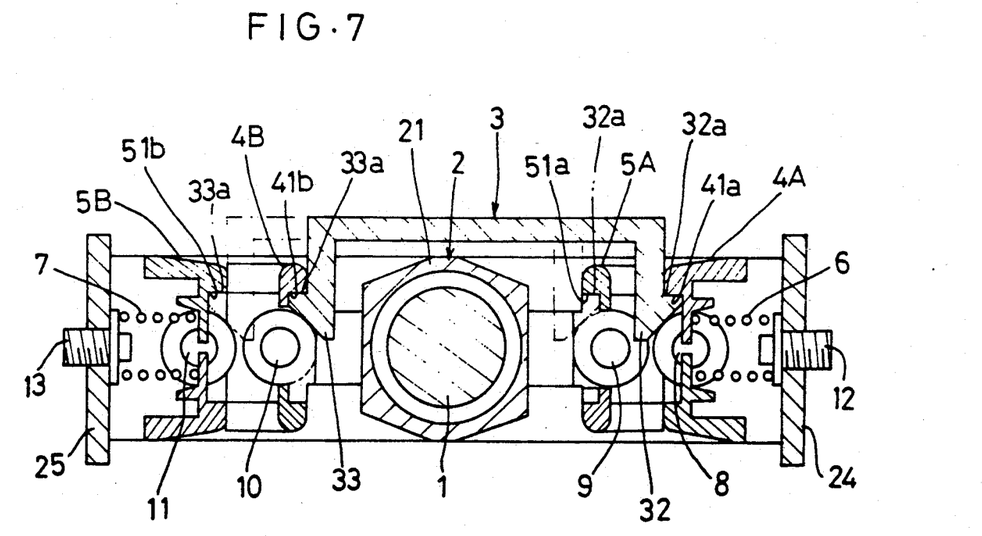

The case of placing the cleat 3 in engagement with the forward clamp members 4A and 4B will be described first. The rider steps down his foot with the guide surface 32b on the front leg 32 of the cleat 3 contacting the guide portion 42a of the first forward clamp member 4A, and the guide surface 33b on the rear leg 33 contacting the guide portion 42b of the second forward clamp member 4B. This downward depression applies a forward component of force to the position of contact between the cleat 3 and the first forward clamp member 4A, and a rearward component of force to the position of contact between the cleat 3 and the second forward clamp member 4B. As a result, as shown in FIG. 6, the first forward clamp member 4A moves to the releasing position against the force of the first springs 6, and the second forward and rearward clamp members 4B and 5B move to the releasing position against the force of the second springs 7. With the movement of the forward clamp members 4A and 4B to the releasing positions, the extreme ends of the front and rear legs 32 and 33 of the cleat 3 advance to the reverse sides of the clamp members 4A and 4B. Then the first forward clamp member 4A moves to the clamping position under the restoring force of first springs 6, and the second forward and rearward clamp members 4B and 5B move to the clamping position under the restoring force of second springs 7, with the engaging portions 41a and 41b engaging the engaging surfaces 32a and 33a of the cleat 3, thereby holding the cleat 3 in position.

Figure 8:
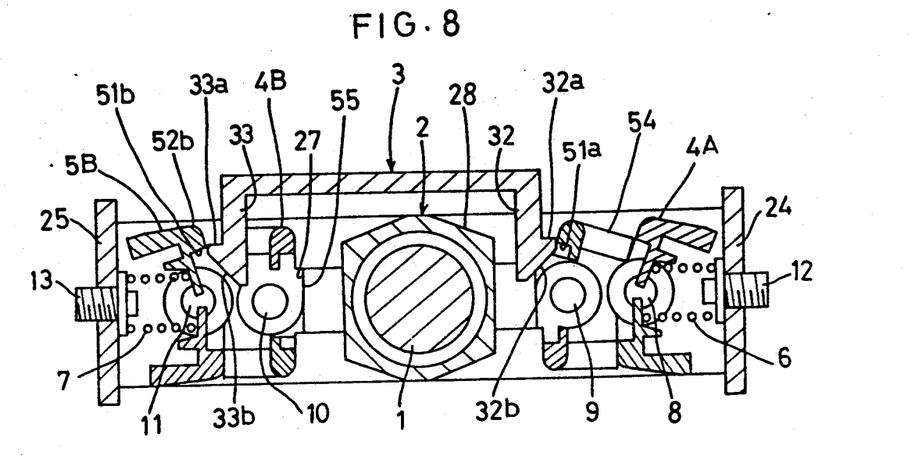

Next, the case of placing the cleat 3 in engagement with the rearward clamp members 5A and 5B will be described first. The rider steps down his foot with the guide surface 32b on the front leg 32 of the cleat 3 contacting the guide portion 52a of the first rearward clamp member 5A, and the guide surface 33b on the rear leg 33 contacting the guide portion 52b of the second rearward clamp member 5B. This downward depression applies a forward component of force to the position of contact between the cleat 3 and the first rearward clamp member 5A, and a rearward component of force to the position of contact between the cleat 3 and the second rearward clamp member 5B. As a result, as shown in FIG. 8, the first rearward clamp member 5A and the first forward clamp member 4A move to the releasing position against the force of the first springs 6, and the second rearward clamp member 5B moves to the releasing position against the force of the second springs 7. With the movement of the rearward clamp members 5A and 5B to the releasing positions, the extreme ends of the front and rear legs 32 and 33 of the cleat 3 advance to the reverse sides of the clamp members 5A and 5B. Then the first rearward clamp member 5A and the first forward clamp member 4A move to the clamping position under the restoring force of first springs 6, and the second rearward clamp member 5B moves to the clamping position under the restoring force of second springs 7, with the engaging portions 51a and 51b engaging the engaging surfaces 32a and 33a of the cleat 3, thereby holding the cleat 3 in position.

As described above, the present invention provides the two forward clamp members 4A and 4B forming a set, and the two rearward clamp members 5A and 5B forming another set, the two sets being spaced by a predetermined distance in the fore and aft direction. The cleat 3 may be placed in engagement with the forward clamp members 4A and 4B or the rearward clamp members 5A and 5B, that is two engaging positions or two engaging opportunities are provided for the cleat 3. Thus, the shoe may be fixed to the pedal reliably without paying much attention. The shoe may be fixed easily and quickly where the invention is applied to a mountain type bicycle, with which the rider frequently moves his or her foot from the pedal to the ground and places it back on the pedal, thereby promoting safety of cycling. The distance from the heel to the pedal body 2 is greater when the cleat 3 is attached to the rearward clamp members 5A and 5B than when the cleat 3 is attached to the forward clamp members 4A and 4B. This facilitates an up and down motion of the condyle of the metatarsals about the ankle joint with an arch formed between the ankle joint and the phalanges joints connected to the metatarsals, thereby promoting operability at times of pedaling. When the cleat 3 is attached to the forward clamp members 4A and 4B, an increased depressing force may be transmitted to the pedal body 2 since, at this time, the distance from the heel to the pedal body 2 is shorter than when the cleat 3 is attached to the rearward clamp members 5A and 5B. Thus, the position of the shoe relative to the pedal may be varied according to different depressing loads for racing and cycling. That is, when running on a flat terrain which involves depressing loads, the cleat 3 may deliberately be placed in engagement with the rearward clamp members 5A and 5B. When running uphill with great depressing loads, the cleat may deliberately be placed in engagement with the forward clamp members 4A and 4B. This construction enables optimal pedaling to suit the depressing loads.

Figure 1:
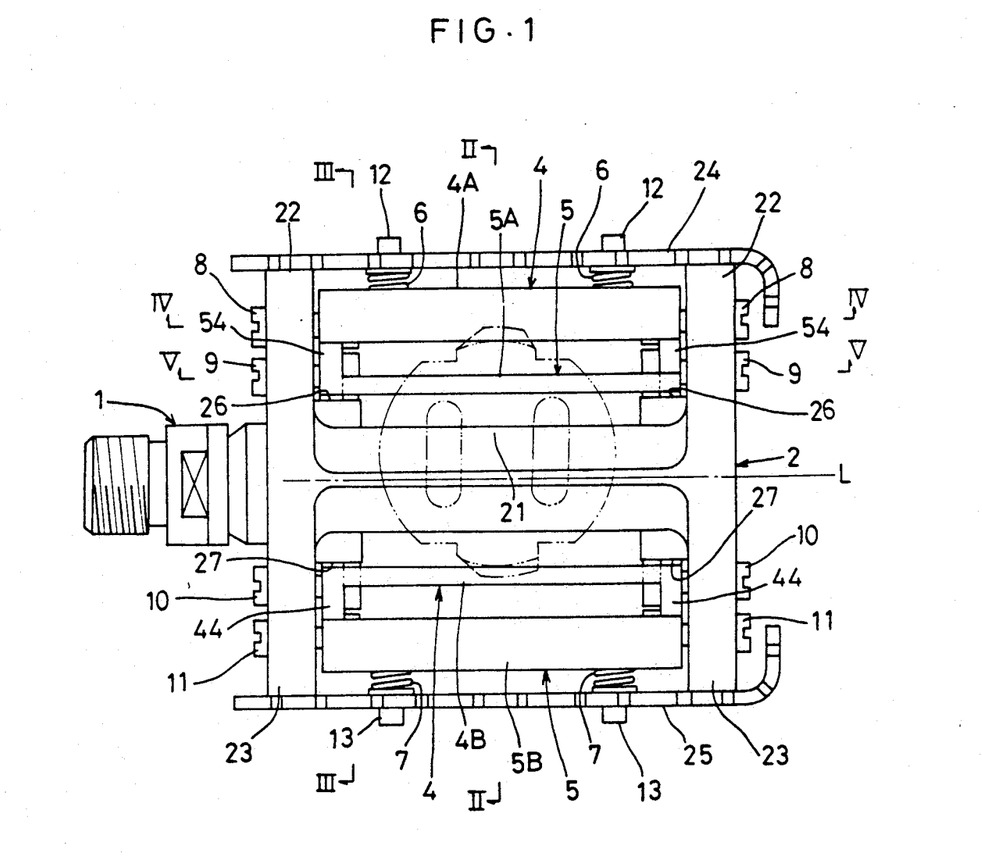
FIG. 1 is a plan view of pedal according to one embodiment of the present invention.
Figure 2:
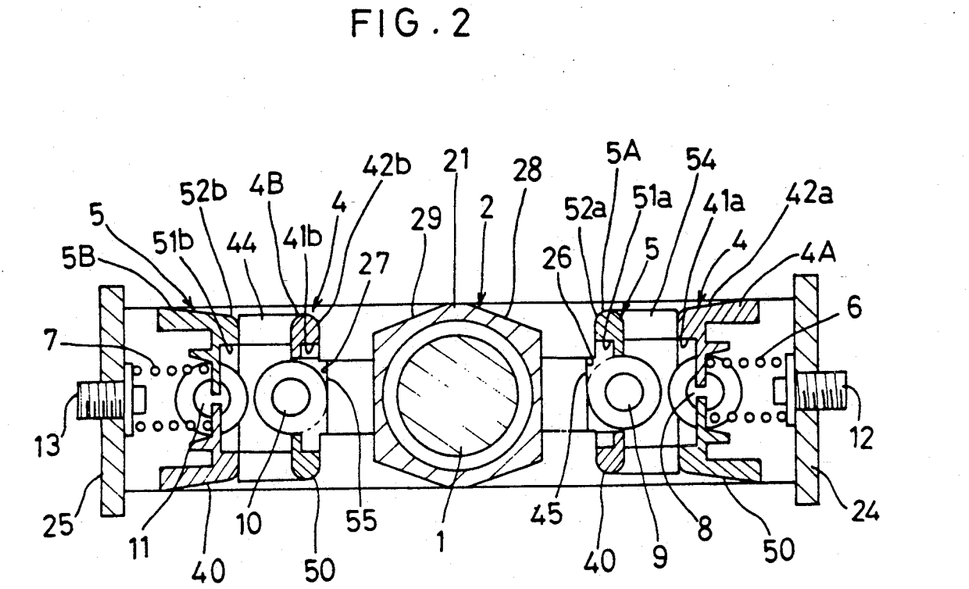
FIG. 2 is an enlarged sectional view taken on line II—II of FIG. 1.
Figure 3:
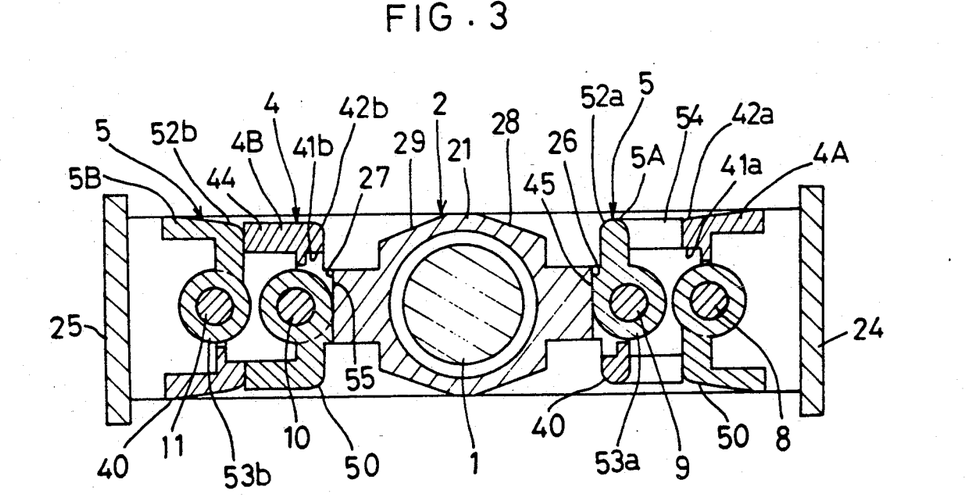
FIG. 3 is an enlarged sectional view taken on line III—III of FIG. 1.
Figure 4:
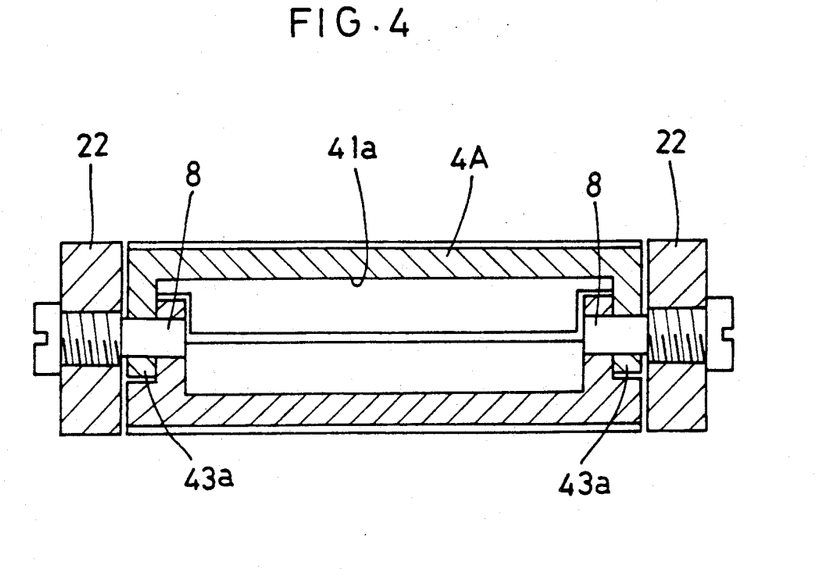
FIG. 4 is an enlarged sectional view taken on line IV—IV of FIG. 1.
Figure 5:
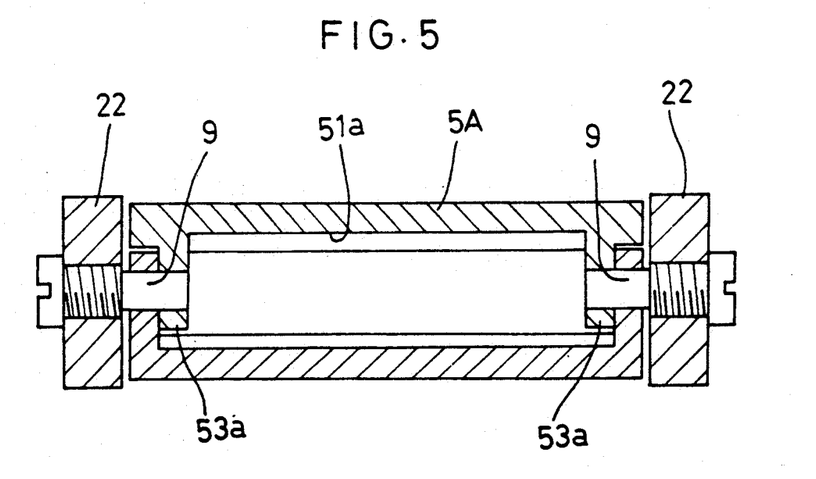
FIG. 5 is an enlarged sectional view taken on line V—V of FIG. 1, FIGS. 6 through 8 are views illustrating operating states.

The engaging portions 41a, 41b, 51a and 51b extend parallel to the axis L of the pedal body 2 as shown in FIG. 1, and over a length exceeding the width of the engaging surface 32a and 33a of the cleat 3. Therefore, even when the cleat 3 being attached is somewhat displaced rightward or leftward from the center of the pedal body 2, the cleat 3 may be fixed in position reliably and promptly without paying much attention. Once placed in position, the cleat 3 may be moved right and left along the engaging portions to an optimal position relative to the pedal body 2. The cleat 3 may be moved to an optimal position with ease since, as described hereinbefore, each of the legs 32 and 33 defines the arcuate outer periphery which allows the shoe to be moved right and left along the engaging portions while turning the shoe right and left.

Further, the clamp members 4A, 4B, 5A and 5B define the guide portions 42a, 42b, 52a and 52b on their respective surfaces for guiding the legs 32 and 33 of the cleat. This construction is capable of smoothly guiding the legs 32 and 33 to the engaging portions, to facilitate attachment of the cleat 3, even when the legs 32 and 33 of the cleat 3 being attached are slightly displaced in the fore and aft direction relative to the clamp members, and either the front leg 32 or rear leg 33 contacts the surfaces of the clamp members.

In addition, the support 21 of the pedal body 2 defines the guide surfaces 28 and 29 for guiding the legs 32 and 33 of the cleat 3 toward the clamp members. This construction is capable of reliably guiding the leg 32 or 33 to the clamp members, to facilitate attachment of the cleat 3, even when the legs 32 and 33 of the cleat 3 being attached are slightly displaced in the fore and aft direction relative to the clamp members, and either the front leg 32 or rear leg 33 contacts the surface of the support 21.

In the described embodiment, the pedal body 2 comprises the forward clamp members 4A and 4B and rearward clamp members 5A and 5B on one face thereof, and the forward clamp members 40A and 40B and rearward clamp members 50A and 50B on the other face. Thus, one of the tread faces of the pedal body 2 may be selected, to which the cleat 3 is attached as described above. This pedal is, therefore, very convenient when applied to a mountain type bicycle.

When detaching the cleat 3 from the pedal, the rider has only to turn his or her foot outwardly on the pedal and lift the inward side of the shoe (opposed to the crank arm) by using the outward side as a pivoting point. This causes the clamp members 4A, 4B, 5A and 5B to move to the releasing positions against the forces of springs 6 and 7. The forces of springs 6 and 7 are adjusted to allow the clamp assembly 4 to be moved with ease by the lifting force of the shoe. The cleat 3 is detachable by lifting the shoe after turning it to an appropriate degree on the tread face of the pedal body 2 to release the cleat from the clamp members. Alternatively, the cleat 3 may be detached simply by lifting the shoe without turning it, to move the clamp members 4A, 4B, 5A and 5B to the releasing positions against the forces of springs 6 and 7.

In the described embodiment, the forward clamp assembly 4 and rearward clamp assembly 5 are provided on each face of the pedal body 2. But these clamp members may be provided on only one face of the pedal body 2.

The clamp members 4A, 4B, 5A and 5B are movable on the pivotal axes 8–11 in the described embodiment. Alternatively, although not shown, the entire clamp members 4A, 4B, 5A and 5B may be movable in the fore and aft direction against the forces of springs 6 and 7.

Figure 9:
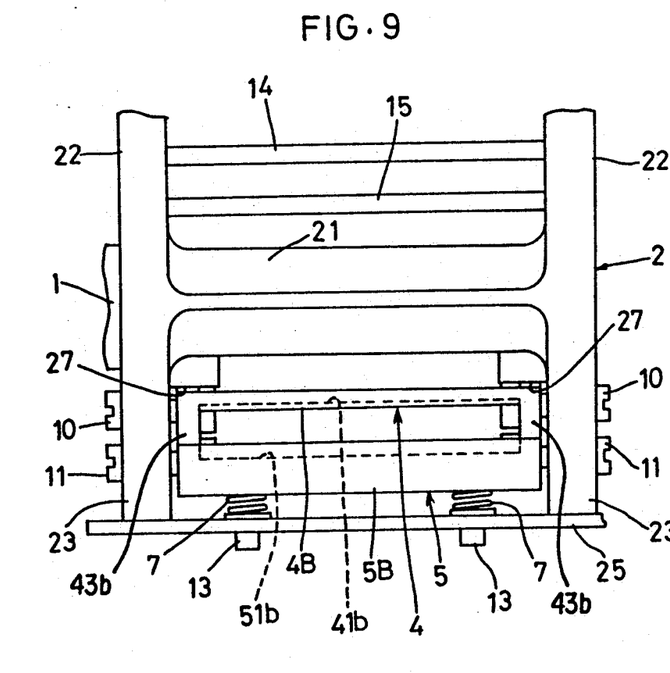
FIGS. 9 and 10 are partial plan views of different embodiments, respectively.
Figure 10:
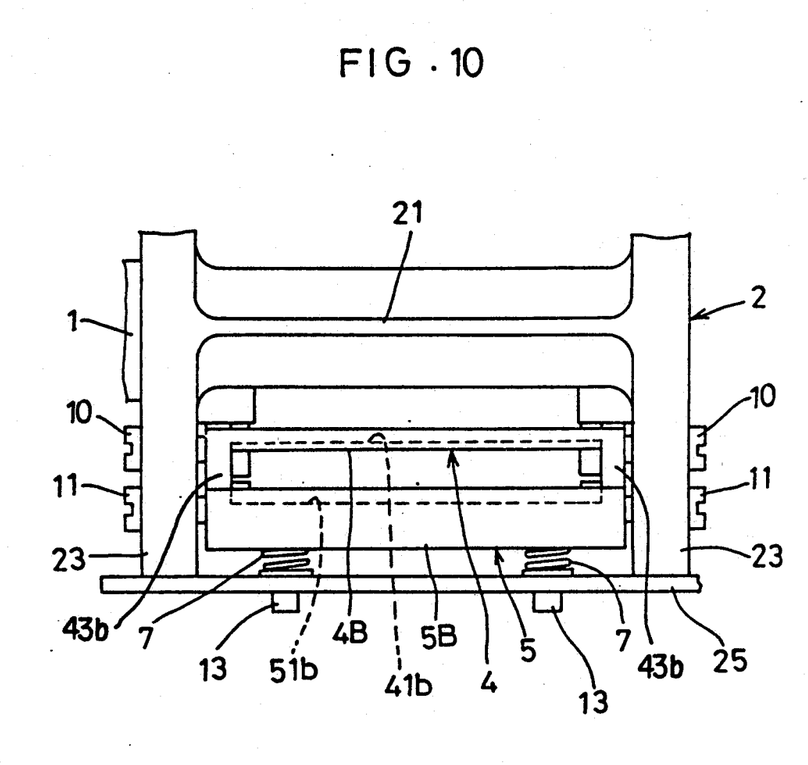

In the described embodiment, the forward clamp assembly 4 and rearward clamp assembly 5 are disposed forwardly and rearwardly of the axis L of the pedal body 2. Instead, the forward clamp member 4 and rearward clamp member 5 may be disposed forwardly or rearwardly of the axis L. In this case, for example, the first forward clamp member 4A and first rearward clamp member 5A or the second forward clamp member 4B and second rearward clamp member 5B are fixed, and the cleat is fixed in position by the fixed clamp members and movable clamp members, or the construction may be modified as shown in FIGS. 9 and 10. Where the cleat is held in position by the fixed clamp members and movable clamp members, the movable clamp members are movable by an amount twice the amount of movement where both clamp members are movable, to enable the cleat 3 to be engageable with and disengageable from the engaging portions. The fixed clamp members may be formed integral with the pedal body 2.

Figure 11:
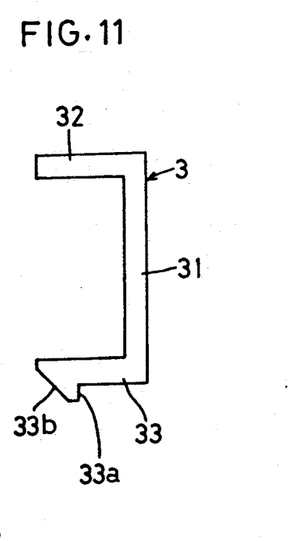
FIGS. 11 and 12 are views illustrating only cleats.

In the construction shown in FIG. 9, the second forward clamp member 4B and second rearward clamp member 5B are mounted between the rear arms 23 of the pedal body 2 to be movable between a clamping position and a releasing position, while restricting members 14 and 15 are mounted between the front arms 22 of the pedal body 2. The restricting member 14 restricts fore and aft movement of the cleat 3 in engagement with the engaging portion 41b of the second forward clamp member 4B. The restricting member 15 restricts fore and aft movement of the cleat 3 in engagement with the engaging portion 51b of the second rearward clamp member 5B. As shown in FIG. 11, the cleat 3 comprises a rear leg 33 including an attachment portion 31, an engaging surface 33a and a guide surface 33b, and a front leg 32 without the engaging surface 32a and guide surface 32b. The cleat 3 is engageable with the forward clamp member 4B or the rearward clamp member 5B, while being prevented from making fore and aft movement by the restricting member 14 and forward clamp member 4B or by the restricting member 15 and rearward clamp member 5B.

Figure 12:
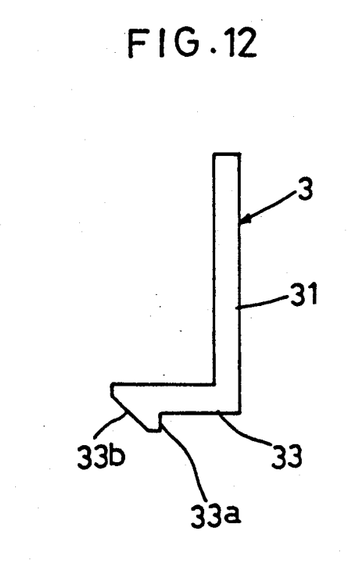

In the construction shown in FIG. 10, the second forward clamp member 4B and second rearward clamp member 5B are mounted between the rear arms 23 of the pedal body 2 to be movable between a clamping position and a releasing position. The rear face of the support 21 opposed to the forward clamp member 4B is utilized to restrict fore and aft movement of the cleat 3 in engagement with the engaging portion 41a of the second forward clamp member 4B. The rear face of the second forward clamp member 4B restricts fore and aft movement of the cleat 3 in engagement with the engaging portion 51b of the second rearward clamp member 5B. As shown in FIG. 12, the cleat 3 comprises a rear leg 33 including an attachment portion 31, an engaging surface 33a and a guide surface 33b. The cleat 3 is engageable with the forward clamp member 4B or the rearward clamp member 5B, while being prevented from making fore and aft movement by the support 21 and forward clamp member 4B or by the forward clamp member 4B and rearward clamp member 5B.

According to the present invention, as described above, the pedal body 2 rotatably supported by the pedal shaft 1 comprises two clamp assemblies 4 and 5 spaced from each other by a predetermined distance in the fore and aft direction. These clamp assemblies 4 and 5 are urged to the clamping position. The cleat is engageable with one of the forward clamp assembly 4 and rearward clamp assembly 5. Hence, the cleat is engageable at two, forward and rearward positions, i.e. the cleat has two opportunities for engagement. The shoe may be fixed to the pedal reliably without paying much attention where the invention is applied to a mountain type bicycle, with which the rider frequently moves his or her foot from the pedal to the ground and places it back on the pedal, thereby promoting safety of cycling. The distance from the heel to the pedal body 2 is greater when the cleat is attached to the rearward clamp assembly 5, which promotes operability at times of pedaling. When the cleat is attached to the forward clamp assembly 4, an increased depressing force may be transmitted to the pedal body 2 since, at this time, the distance from the heel to the pedal body 2 is shorter. Thus, the position of the shoe relative to the pedal may be varied according to different depressing loads for racing and cycling, to enable optimal pedaling to suit the depressing loads.

What is claimed is:

1. A bicycle pedal comprising:
   (A) a pedal body rotatably supported by a pedal shaft;
   (B) a first clamp assembly mounted on said pedal body for engaging a cleat of a shoe, said first clamp assembly including (a) a front clamp member provided with an engaging portion and (b) a rear clamp member provided with an engaging portion, said rear clamp member being separated from said front clamp member in a direction which is transverse to said pedal shaft, at least one of said front and rear clamp members being movable between a clamping position and a release position;
   (C) a second clamp assembly mounted on said pedal body for engaging the cleat, said second clamp assembly including (a) a front clamp member provided with an engaging portion and (b) a rear clamp member provided with an engaging portion, said rear clamp member of said second clamp assembly being separated from said front clamp member of said second clamp assembly in said transverse direction, at least one of said front and rear clamp members of said second clamp assembly being movable between a clamping position and a release position, said second clamp assembly being offset from said first clamp assembly in said transverse direction; and
   (D) an urging means for urging said movable clamp members of said first and second clamp assemblies to their respective clamping positions.

2. A bicycle pedal as claimed in claim 1 wherein said two clamp assemblies are provided on each of opposite faces of said pedal body.

3. A bicycle pedal as claimed in claim 2 wherein said clamp assemblies define cleat engaging surfaces extending substantially parallel to said pedal shaft, said cleat engaging surfaces permitting said cleat to move in a direction which is parallel to said pedal shaft.

4. A bicycle pedal as claimed in claim 1 wherein said clamp assemblies define cleat engaging surfaces extending substantially parallel to said pedal shaft, said cleat engaging surfaces permitting said cleat to move in a direction which is parallel to said pedal shaft.

5. A bicycle pedal comprising:
   (A) a pedal body rotatably supported by a pedal shaft;
   (B) a first clamp assembly mounted on said pedal body for engaging a cleat of a shoe, said first clamp assembly including (a) a front clamp member provided with an engaging portion and (b) a rear clamp member provided with an engaging portion, said rear clamp member being separated from said front clamp member in a direction which is transverse to said pedal shaft, said front and rear clamp members being movable between a clamping position and a release position;
   (C) a second clamp assembly mounted on said pedal body for engaging the cleat, said second clamp assembly including (a) a front clamp member provided with an engaging portion and (b) a rear clamp member provided with an engaging portion, said rear clamp member of said second clamp assembly being separated from said front clamp member of said second clamp assembly in said transverse direction, said front and rear clamp members of said second clamp assembly being movable between a clamping position and a release position, said second clamp assembly being offset from said first clamp assembly in said transverse direction; and
   (D) a first urging means for urging said front clamp members to their respective clamping positions and a second urging means for urging said rear clamp members to their respective clamping positions.

* * * * *